(12) United States Patent
Verikoukis et al.

(10) Patent No.: US 8,792,577 B2
(45) Date of Patent: Jul. 29, 2014

(54) METHOD AND APPARATUS FOR MEDIUM ACCESS CONTROL IN A WIRELESS BROADBAND SYSTEM WITH MULTIPLE-INPUT MULTIPLE-OUTPUT OR MULTIPLE-INPUT SINGLE-OUTPUT TECHNOLOGY WITH MULTIUSER CAPABILITIES

(75) Inventors: Christos Verikoukis, Castelldefels (ES); Nizar Zorba Barah, Amman (JO); Elli Kartsaki, Castelldefels (ES); Luis Alonso Zárate, Castelldefels (ES)

(73) Assignee: Fundacio Privada Centre Tecnologic de Telecomunicions de Catalunya (ES)

( * ) Notice: Subject to any disclaimer, the term of this patent is extended or adjusted under 35 U.S.C. 154(b) by 254 days.

(21) Appl. No.: 13/377,687

(22) PCT Filed: Jun. 12, 2009

(86) PCT No.: PCT/EP2009/057276
§ 371 (c)(1),
(2), (4) Date: Dec. 12, 2011

(87) PCT Pub. No.: WO2010/142343
PCT Pub. Date: Dec. 16, 2010

(65) Prior Publication Data
US 2012/0082200 A1    Apr. 5, 2012

(51) Int. Cl.
*H04B 7/02* (2006.01)
(52) U.S. Cl.
USPC .......... 375/267; 375/295; 375/224; 375/278; 375/227; 370/310

(58) Field of Classification Search
USPC ......................................... 375/267
See application file for complete search history.

(56) References Cited

U.S. PATENT DOCUMENTS

| 6,870,820 B1 * | 3/2005 | Forssell et al. ............. 370/328 |
| 8,165,530 B2 * | 4/2012 | Lee et al. .................. 455/67.13 |
| 2007/0160162 A1 | 7/2007 | Kim |

(Continued)

FOREIGN PATENT DOCUMENTS

| KR | 1020090004662 | 1/2009 |
| WO | 2006120649 A2 | 11/2006 |

(Continued)

OTHER PUBLICATIONS

International Search Report PCT/EP2007/057276; Dated May 19, 2005.

*Primary Examiner* — Lihong Yu
(74) *Attorney, Agent, or Firm* — Cantor Colburn LLP

(57) ABSTRACT

Method and apparatus for medium access control in a wireless broadband system with multiuser MIMO/MISO technology comprising the steps of a transmitter (Tx) broadcasting a polling message (1) to all the users ($Rx_1 \ldots Rx_i \ldots RX_N$) associated to said transmitter (Tx); the users answering with reply messages (2) during a time slot ($6_1 \ldots 6_m$) randomly selected from a plurality of time slots in which a period of time dedicated to sending reply messages (5) is divided; the transmitter (Tx) performing a scheduling and transmission of data (3); and scheduled users sending Acknowledgment messages (4). Preferably, only users which measure a Signal to Noise plus Interference Ratio over a pre-defined threshold for a transmission beam send reply messages (2).

10 Claims, 4 Drawing Sheets

(56) References Cited

U.S. PATENT DOCUMENTS

| | | |
|---|---|---|
| 2007/0189235 A1 | 8/2007 | Chandra et al. |
| 2008/0219194 A1* | 9/2008 | Kim et al. ............... 370/310 |
| 2008/0317155 A1* | 12/2008 | Orfanos et al. ........... 375/267 |
| 2009/0046681 A1 | 2/2009 | Kalogridis |

FOREIGN PATENT DOCUMENTS

| | | |
|---|---|---|
| WO | 2008012766 A2 | 7/2007 |
| WO | 2008060203 A1 | 5/2008 |
| WO | 2008135833 A2 | 11/2008 |

* cited by examiner

METHOD AND APPARATUS FOR MEDIUM ACCESS CONTROL IN A WIRELESS BROADBAND SYSTEM WITH MULTIPLE-INPUT MULTIPLE-OUTPUT OR MULTIPLE-INPUT SINGLE-OUTPUT TECHNOLOGY WITH MULTIUSER CAPABILITIES

FIELD OF THE INVENTION

The present invention relates to the integration of Multiple-Input Multiple-Output (MIMO) and Multiple-Input Single-Output (MISO) technologies in wireless networks, more specifically, to Medium Access Control (MAC) in such scenarios.

BACKGROUND OF THE INVENTION

Given the widespread deployment of Wireless Broadband systems in the recent years and the increasing requirements of multimedia applications, the need for high capacity and enhanced reliability has become imperative. Multiple-Input Multiple-Output (MIMO) technology, which uses multiple antennas for emitting and receiving, and its single receiving antenna version, Multiple-Input Single-Output (MISO), promise a significant performance boost and have been incorporated in the emerging Broadband wireless systems.

MIMO/MISO schemes can be used to establish reliable point-to-point communications with a high throughput (single user MIMO/MISO), but, by using multiple antennas at the transmitter, it is also possible to achieve simultaneous point-to-multipoint transmissions and serve multiple users at the same time, through the same frequency and code. The MIMO/MISO multiuser transmission concept, where data streams are assigned to different users, is shown to increase the overall system capacity when compared to single-user MIMO transmission where all streams are dedicated to just one user.

In order to implement multiuser MIMO/SIMO systems, a Medium Access Control (MAC) Protocol has to be established. The most important operations that must be handled by a MAC protocol are the channel access, the scheduling and the feedback acquisition.

U.S. 2009/0046681 A1 provides a very interesting approach to make the MAC for more than one stream at the same time, where this can be applied to MIMO point-to-point spatial multiplexing and/or to OFDM subcarriers allocation. The idea is to enlarge the headers to support the channel estimation of more than one channel at the same time. It does not make any consideration of multiuser MIMO, where the data streams are for different users in the same time, frequency and code; where each user receives its signal together with the other user signal, and no collision is decided in the system.

Other contributions to the field, include KR 2009/0004662, in which the users selection in MIMO multiuser systems is presented, where the selection is based on the SNIR metric. EP 1,882,313 is related to the receiver side and whether to decide that several users access the channel at the same time, as the receiver with its multiuser detection capabilities (MUD) can separate the different users or not. All the intelligence is located at the receiver side and it does not deal with users scheduling, MAC design nor the transmitter decisions.

Finally, in WO 2008/012766 the considered scenario is with one base station and several users in the network, and how to manage the access of the users through OFDMA or any other multicarrier system. MC-CDMA for example is proposed, but no more than one user can be serviced through the same time, frequency and code, i.e. no spatial multiplexing is presented in the system.

Finally, a practical MAC scheme named Multi-User Distributed Coordination Function (MU-DCF), intended for multiuser MIMO/MISO Ad Hoc transmissions, has been presented in "A MAC Protocol with Multi-user MIMO Support for Ad-Hoc WLANs" (J. Mirkovic, J. Zhao, and D. Denteneer, IEEE PIMRC, September 2007). This protocol is a modification of the 802.11 DCF where a four-way handshake is initiated by a special multiuser Ready To Send (RTS) frame that includes a polling address list. Nevertheless, the inclusion of the polling list in the RTS frame uses part of the network resources, thus resulting in a reduction of the available throughput.

SUMMARY OF THE INVENTION

The current invention solves the aforementioned problems by disclosing a Medium Access Control protocol for a wireless broadband system with MIMO/MISO multiuser capabilities, which allows a transmitter to serve a plurality of users at the same time, frequency and code, while reducing the employed resources required by control messages and thus increasing the available bandwidth for data and improving the global user experience.

In one aspect of the invention, a method for Medium Access Control in multiuser MIMO/MISO is disclosed. The method presents the following steps performed by a transmitter and a plurality of users served by the transmitter:

The transmitter creates a plurality of transmission beams using a plurality of antennas. These beams share the same frequencies, and are multiplexed in space.

The transmitter broadcasts a polling message to all the connected users over every transmission beam. By using a single broadcast address instead of including a complete polling list of potential user addresses, the required control overhead is reduced, leaving more free resources for data transmission. Preferably, the polling message comprises a field which indicates the duration of the contention phase, which is the step in which the users answer the transmitter by means of reply messages.

Each user which receives the polling message, measures a Signal to Noise plus Interference Ratio (SNIR) for each of the transmission beams.

In a preferred option, every user sends a reply message comprising, at least, the highest SNIR measured by that user among the transmission beams, and an identifier of the transmission beam for which that highest SNIR is measured. As all the users share the same channel in the contention phase, without any scheduling, a random delay is included by each user prior to the sending of the reply message. For this purpose, the contention phase is divided into a number of time slots, and each user randomly chooses one of the slots to send the reply message in. Preferably, the duration of the slots is equal to the amount of time needed by a user to send a reply message plus a security margin. As the length of the reply message frame and the transmission rate are fixed, this amount of time is a constant. With the described division into slots, if two or more reply messages from different users collide, the collision only affects a given time slot, thus allowing a higher number of reply messages to be correctly received at the transmitter.

In another preferred option, only the users whose highest SNIR measured among transmission beams is above a pre-defined threshold send the reply message, following the same steps and conditions for the transmission of the reply message as the previously described preferred option. The number of replies is thus reduced, minimizing the number of collisions and increasing the achievable output.

Preferably, the transmitter checks if any reply message is correctly received, that is, a reply message which has suffered no collisions, before continuing with the rest of the steps. If no reply message is correctly received, the previous steps, starting from the transmission beam creation, are repeated until at least a reply message is correctly received, which means that at least one transmission beam can be scheduled and used to transmit data.

With the information contained in the correctly received reply messages, the transmitter performs the scheduling, that is, assigns transmission beams to the users. Preferably, each transmission beam is assigned to the user whose reply message includes the highest SNIR value for that transmission beam, that is, the user which indicates the highest SNIR for that transmission beam among all users. Multiple variations of this scheduling algorithm can be implemented within the scope of the present invention.

Data transmission is then performed according to the scheduling decisions.

Finally, each user which correctly received data, sends an Acknowledgement message.

Another aspect of the present invention discloses an apparatus for Medium Access Control in a wireless broadband system with MIMO/MISO technology with multiuser capabilities. The apparatus comprises control means both at a transmitter and at the users connected to the transmitter, a plurality of which are served by the transmitter at a given time by means of a plurality of transmitting antennas which generate a plurality of transmission beams which share time, frequency and code.

The transmitter comprises control means configured to broadcast a polling message to all the users connected to the transmitter, over each one of the transmitting beams.

The user comprises computational means to compute a SNIR value for each transmission beams, and control means at the user configured to answer with a reply message after including a random delay. Reply messages comprise, at least, an identifier of a transmission beam with the highest SINR and that highest SINR value. The period of time dedicated to the reply messages is slotted, that is, the aforementioned random delay included by the control means at the receiver is selected from a finite number of values which correspond to the multiples of a fixed time required by a user to send a reply message plus a security margin.

The transmitter also comprises a scheduler configured to schedule the the use of the transmission beams according to information comprised in polling messages sent by the users. Preferably, the scheduler assigns each transmission beam to the user which indicates a highest SINR value for that transmission beam among all the reply messages.

Also preferably, in order to reduce unnecessary control traffic, a user only answers polling requests with a reply message if the highest measured SNIR among the transmission beams at the user is above a certain threshold.

With the disclosed method a system, an efficient medium access control for MIMO/MISO systems is achieved, minimizing the use of resources occupied by this control and allowing a high data throughput. This and other advantages will be clear in the light of the detailed description of the invention.

BRIEF DESCRIPTION OF THE DRAWINGS

For a better understanding of the features of the invention and according to its preferred embodiment, a series of figures are presented to complement this description. These figures are an integrating part of said description, being illustrative rather than limitative.

DETAILED DESCRIPTION OF THE INVENTION

Figure 1:
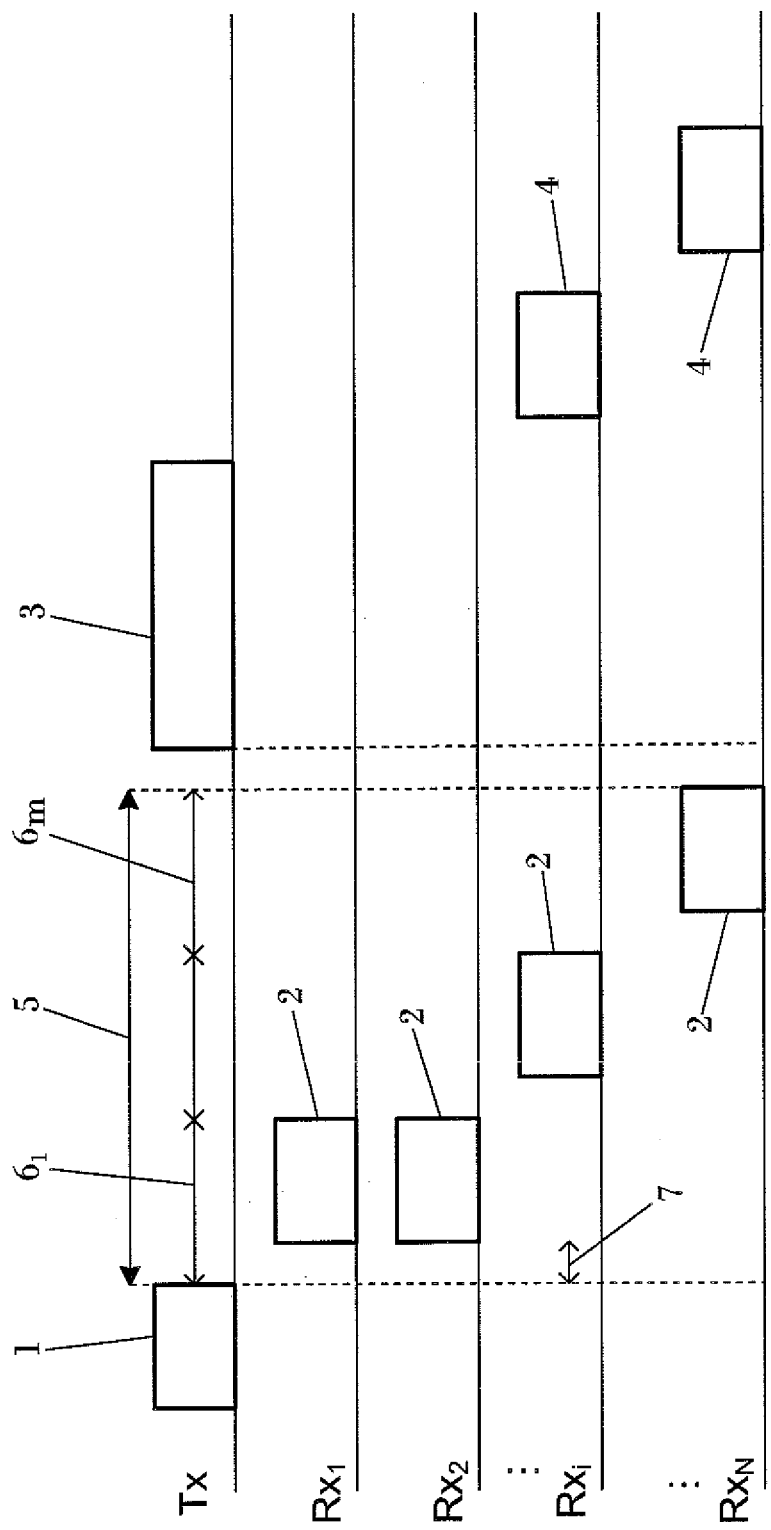
FIG. 1 depicts an exchange of messages between the transmitter and a plurality of users following a preferred embodiment of the method.

In the context of the present invention, the term "comprises" and its derivations (such as "comprising", etc.) should not be understood in an excluding sense, that is, these terms should not be interpreted as excluding the possibility that what is described and defined may include further elements, steps, etc.

Additionally, the term "users" ($Rx_1 \ldots Rx_N$) is used in this document to refer to the mobile terminals, receivers or users of the MIMO/MISO system, as opposed to the "transmitter" (Tx), which is the equipment comprising a plurality of antennas which performs the beamforming and scheduling, and which can refer to Access Point or Base Station according to some terminologies.

A number of theoretical definitions are presented in order to define the elements involved in the method of the invention and to explain the calculations which are performed by the users ($Rx_1 \ldots Rx_N$) in order to compute the SNIR values required by the method as detailed further in this section.

A multiantenna channel is considered between each of the N users ($Rx_1 \ldots RxN$) and the transmitter (Tx). This multiantenna channel can be represented by a vector $h_{[1 \times nt]}$ (having $n_t$ elements). Through the channel, a quasi static block fading model is assumed which keeps constant through the coherence time, and independently changes between consecutive time intervals with independent and identically distributed (i.i.d.) complex Gaussian entries, with zero mean and unit variance.

Let x be the $n_t \times 1$ transmitted vector (by the $n_t$ transmit antennas), while $y_i$ denotes the $i^{th}$ user received signal given by $$y_i = h_i x + z_i$$

where $z_i$ is an additive complex noise component with zero mean and variance $E\{|z_i|^2\} = \sigma^2$.

Among the N users ($Rx_1 \ldots Rx_N$) in the system, the transmitter delivers service to M simultaneous users (M≤N) through the generation of M random beams b1 b2 . . . $b_M$. Each generated beam is transmitted over the $n_t$ transmitting antennas The transmitted signal x encloses the uncorrelated data symbols $s_i$ to each one of the M selected users with $E\{|s_i|^2\} = 1$.

The transmission technique used in this multiuser scenario is the multibeam opportunistic beamforming, where this multibeam strategy achieves a high total throughput by serving several users at the same time, making the transmitted signal x to enclose the data symbols for the M selected users as $$x = \sum_{m=1}^{M} x_m = \sum_{m=1}^{M} b_m s_m = BS$$

wherein $b_m$ is the beam assigned to the $m^{th}$ user and S is a vector comprising the M data symbols ($S=[s_1, \ldots, s_M]$). The matrix $B=[b_1, \ldots, b_M]$ is randomly generated following an orthonormal policy to produce the lowest possible interference among the served users.

Therefore, each user receives broadcast packets with a certain power level from each one of the transmitting beams. One of these beams carries information for the ith user (beam with useful information for the ith user), while the other beams carry information for other users (this is interference for the ith user).

Therefore, the SNIR formulation for the $i^{th}$ user through the $m^{th}$ beam, with several transmitting orthogonal beams, is:

$$SNIR_{i,m} = \frac{|h_i b_m|^2}{\sigma^2 + \sum_{u \neq m}^{M} |h_i b_u|^2}$$

Assuming a uniform power allocation among the beams.

Using the information contained in the polling message, further detailed in this section, each one of the N users sequentially calculates the received power from each one of the M beams. The previous expression is then applied to obtain the SNIR value with respect to each beam.

FIG. 1 shows an exchange of messages between a transmitter (Tx) and a plurality of N users ($Rx_1 \ldots Rx_N$) in a preferred embodiment of the invention, which is to be considered as an illustrative and non limiting example.

The network in which this exchange takes place can be any wireless network which implements multiuser MIMO/MISO. The protocol architecture can be based on the IEEE 802.11n standard, although other implementations are possible within the scope of the invention. The following detailed description of a preferred embodiment is described for the IEEE 802.11n standard and uses its terminology, although it is valid for any other broadband wireless communication system.

In an IEEE 802.11n system, the transmitter (Tx) is named as Access Point (AP). The Request to Send (RTS) message as defined by standard IEEE 802.11n can be used as polling message (1), and the Clear to Send (CTS) message as defined by standard 802.11n can be used as reply message (2). The frame structure of both messages is further explained in this section. The period of time dedicated to the transmission of CTS messages (5) is called contention phase.

The process starts with the AP (Tx) generating a plurality of transmission beams and the broadcasting of an RTS message (1) to the N users ($Rx_1 \ldots Rx_N$). This message includes the duration of the subsequent contention phase (5), which starts right after the conclusion of the RTS message (1).

The contention phase (5) is divided into m slots ($6_1 \ldots 6_m$), each of which has a duration of a time required to send a CTS frame, which has a fixed length, plus a security margin (7) which accounts for processing times and possible delays in the network. For example in IEEE 802.11n standard, this security margin is defined as Short-Interframe Space (SIFS), and its exact duration is determined in the physical layer of the standard.

Depending of the embodiment, all the users ($Rx_1 \ldots RX_N$), or those whose highest measured SNIR are greater than a pre-defined threshold, reply with CTS messages (2). CTS messages (2) are then sent in a randomly selected slot ($6_1 \ldots 6_m$) of the contention phase (5). In the example of FIG. 1, both the first user ($Rx_1$) and the second user ($Rx_2$) choose the same slot ($6_1$), thus resulting in a collision that leaves them out of the scheduling process. CTS messages from the ith user ($Rx_i$) and the Nth user ($Rx_N$) are not involved in any collision, and thus are considered for the scheduling process.

In the CTS message (2), each user ($Rx_i$) indicates which is the transmission beam for which the user ($Rx_i$) measures the highest SNIR ratio, also including in the CTS message the value of said highest SNIR ratio. In a non-limiting example, SNIR values are transmitted expressed in dB, being then converted at the AP (Tx) into transmission bitrates according to a conversion table that takes into consideration both the available bandwidth and the chosen modulation and coding. The measure of the SNIR value is further detailed in this section.

The simplest approach for the scheduling, which does not exclude additional or alternative policies, is to assign each transmission beam to the user which indicates in the CTS message (2) the highest value for that beam among all users ($Rx_i \ldots RX_N$). If no CTS messages (2) are correctly received, the AP (Tx) starts over by sending a new RTS message (1). With this condition, the method verifies that at least one transmission beam can be used for scheduling and data transmission.

Then, the AP (Tx) simultaneously transmits a MAC Protocol Data Unit (MPDA) for each one of the beams, delivering data (3) to all the scheduled users at the same time, which, in the example of FIG. 1, are the ith and Nth users ($Rx_i, Rx_N$). Each MPDA contains specific data for the addressed user, that is, a MPDA contains different data than other MPDAs which are simultaneously transmitted (as opposed to broadcasting data).

After a correct reception of data (3), the scheduled users ($Rx_i, Rx_N$) send Acknowledge (ACK) messages (4). The order in which these ACK messages (4) are to be sent to avoid collisions, can be implicitly determined by the beam order, or explicitly indicated in a field of the MPDA frame.

Figure 2:
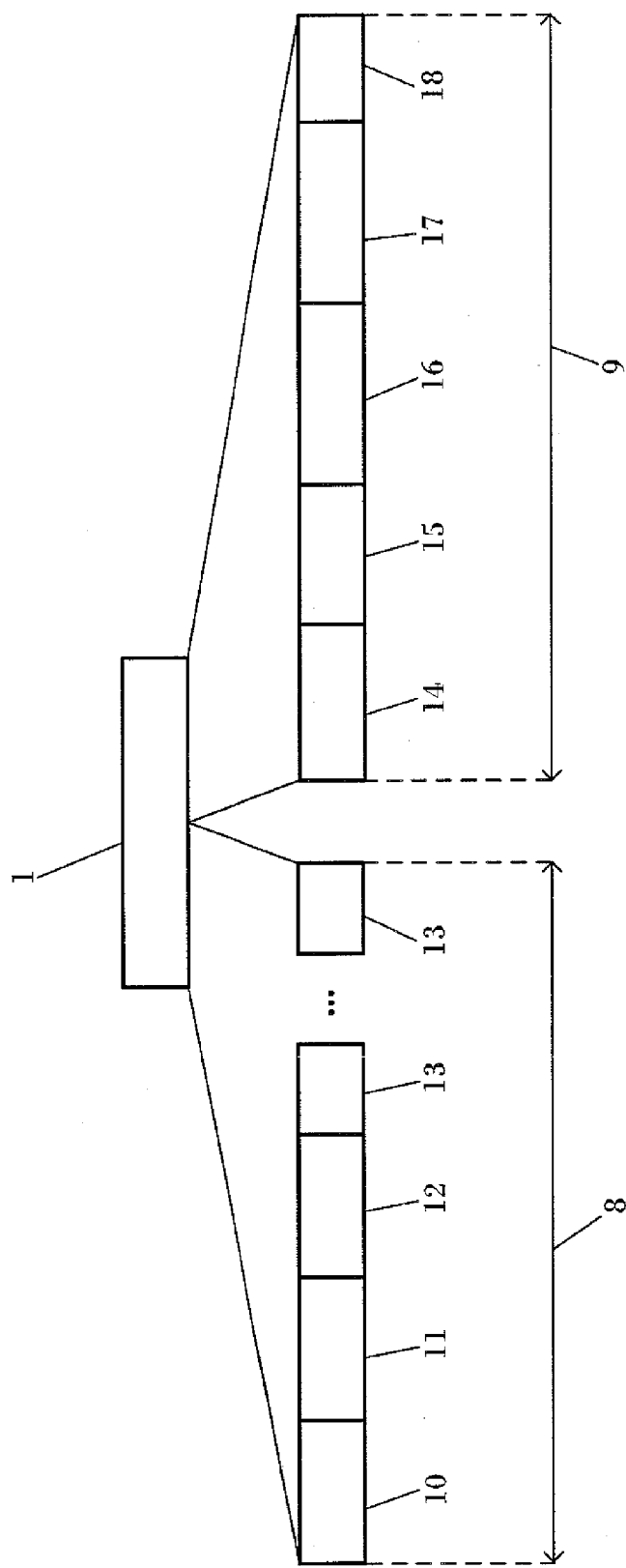
FIG. 2 presents the structure of a polling message frame showing the MAC and physical headers of a preferred embodiment.

FIG. 2 shows a possible structure for a RTS frame (1) based on the IEE 802.11 standard. This frame has the following characteristics:

a) The Physical (PHY) layer preamble (8) contains sufficient training fields to enable the estimation of the MIMO channel. The exact form and duration of these fields depends on the Physical Layer specification of each system. The RTS format shown in the FIG. 2 follows the IEEE 802.11n standard, in the Greenfield operation mode. The preamble contains the following fields:

The HT Signal Field (HT-SIG) (12) provides all the information required to interpret the HT packet format. It has a length of 8 μs.

The HT GF Short Training Field (HT-GF-STF) (10) is used for AGC (Automatic Gain Control) convergence, timing acquisition, and coarse frequency acquisition. It has a length of 8 μs.

One or several HT Long Training Fields (HT-LTF1, HT-LTF) are provided as a way for the receiver to estimate the channel between each spatial mapper input and receive chain. HT-LTF1 (11) field has a length of 8 μs, while each HT-LTF (13) field has a length of 4 μs.

b) The MAC headers (9) of the RTS frame (1) are:
The Frame Control (14), specified by the 802.11 standard, with a duration of 2 bytes.
The Duration Field (15), which indicates the duration (in microseconds) of the contention phase (5) plus the duration of one SIFS (7), with a duration of 2 bytes.
The Receiver address field (16), which contains a broadcast address since it is directed to all the users ($Rx_1 \ldots RX_N$) within the range of the AP (Tx). The Receiver address field (16) has a duration of 6 bytes.
The transmitter address (17), which is the address of the Access point (Tx), and which has 6 bytes.
The Frame Check Sequence (FCS) (18), specified by the 802.11 standard.

Figure 3:
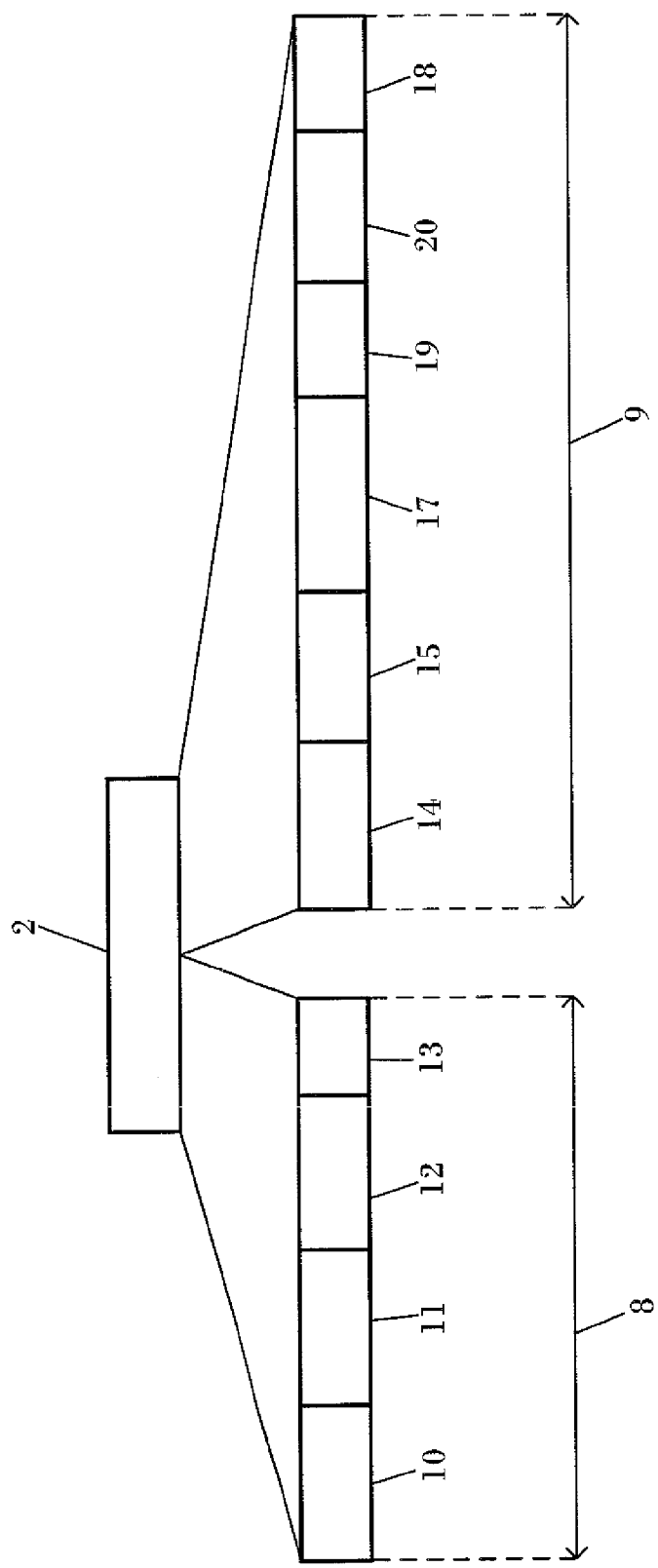
FIG. 3 presents the structure of a reply message frame showing the MAC and physical headers of a preferred embodiment.

FIG. 3 shows a possible structure for a CTS frame (2) based on the IEEE 802.11 standard. This frame has the following fields:

a) The PHY layer preamble (8), which is the same as in the RTS frame (2). In the example it is assumed that the users ($Rx_1 \ldots RX_N$) are equipped with a single antenna (MISO scenario) and thus there is only one HT-LTF field (13). In case of a MIMO scenario, where the users have multiple antennas, the CTS message (2) contains one HT-LTF field (13) for each spatial stream.

b) The MAC headers (9) of the CTS frame (2) are:
The Frame Control (14).
The Duration Field (15), which indicates the time (in microseconds) until the end of the contention phase (5) plus the duration of one SIFS (7).
The transmitter address field (17) contains the address of the user that transmits the CTS (2). It is not necessary to include a receiver address, since all CTS frames are destined to the AP.
The SNIR field (19) contains the maximum Signal-to-Noise-plus-Interference ratio measured by the user among all the transmission beams upon reception of the RTS message (1). The length of this field depends on the quantization used to express SNIR values. As a reference, an indicated value for the SNIR field (19) is 7 bits.
The Beam Identifier (20) indicates the transmission beam that corresponds to the maximum SNIR value. The length of this field also depends on the number of available beams. As a reference value, for a MISO system with two transmission beams, 1 bit is sufficient for this field.
The Frame Check Sequence (FCS) (18)

Another important aspect that determines the performance of the method of the invention is the election of the parameters of the method, that is, the number m of time slots ($6_1 \ldots 6_m$) of the contention phase (5) and the SNIR threshold below which a user does not reply to a RTS message (1).

Figure 4:
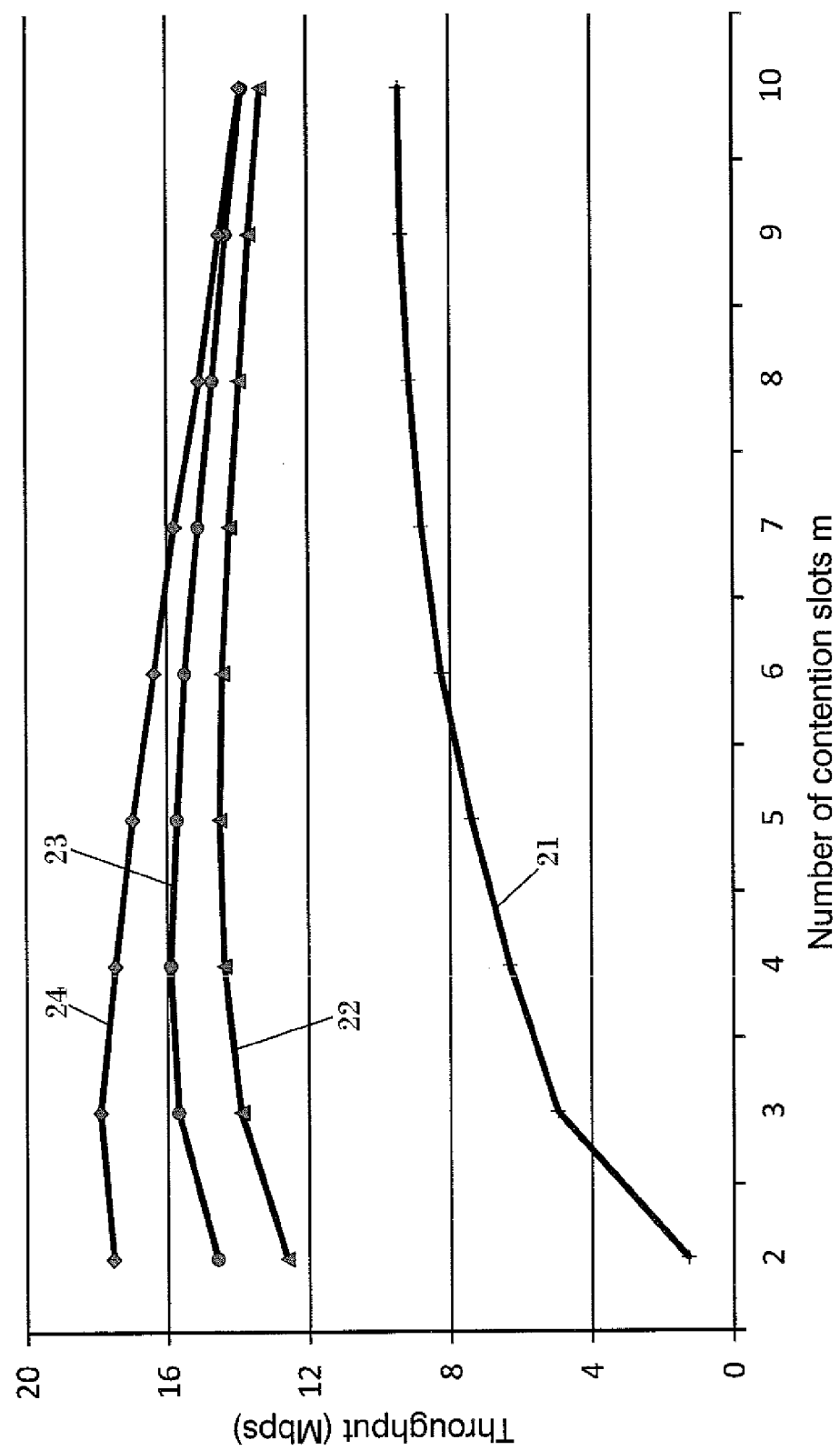
FIG. 4 presents the results of a simulation which shows the achieved throughput by different embodiments of the method of the invention in a same scenario.

The optimization of both parameters largely depends on many factors of the particular scenario, such as the number N of users, number of transmission beams and available bandwidth. As an example, FIG. 4 shows the results of simulating the achieved throughput for different thresholds and number of time slots in the contention phase. The first set of data (21) refers to a system with no threshold. The second (22), third (23) and fourth (24) sets of data refer to systems with threshold values of 6 Mbps, 9 Mbps and 12 Mbps.

The simulation considers 10 users with an infinite amount of data traffic to be transmitted to all users by the AP, where an error-free data transmission is assumed. An adaptive modulation strategy is employed with a fixed packets length of 2312 bytes. It is also assumed that the PHY layer preamble (8) includes training sequences that enable the instantaneous SNIR estimation for each transmission beam. For this purpose, a number of HT-LTFs (High Throughput Long Training Fields) (13) is added. The minimum rate of 6 Mbps is used for all control frames. At the MAC layer simulations, the 802.11 frame format has been used. The size of the MAC header (9) in the RTS frame (2) is 20 bytes as shown in FIG. 2.

The underlying MISO channel is simulated in accordance to the 802.11 channel models, where the user position is randomly selected in a radius of 20 meters around the AP (Tx). The AP (Tx) has 2 transmitting antennas and the system bandwidth is 20 MHz. A noise variance of −80 dBW/Hz with a total antennae (AP and user) gain factor of 6 dBi are also assumed.

As shown on FIG. 4, the optimal number of time slots is higher when there is no threshold, as the number of CTS messages (2) is higher and thus the probability of collisions therefore. The use of SNIR threshold greatly increases the achieved throughput, and as there are users which do not send CTS messages (2), a lower number of time slots are required in the contention phase (5).

Also, a higher threshold increases the throughput of the system, as it reduces the number of users that send CTS messages (2) and thus compete in the contention phase and scheduling. Nevertheless, by increasing the threshold, there is a higher risk of not servicing the users which present the worst transmission conditions. A balance between this risk and the total throughput is to be regarded taking into consideration each particular scenario of implementation.

The invention claimed is:

1. A method for Medium Access Control in a wireless broadband system with Multiple-Input Multiple-Output or Multiple-Input Single-Output technology with multiuser capabilities, the method comprising:
   (i) creating, by means of a plurality of antennas comprised by a transmitter, a plurality of transmission beams which are multiplexed in space;
   (ii) broadcasting from the transmitter to a plurality of users through every transmission beam a polling message which requests a state information of, at least, one transmission beam, said polling message includes a length of a period of time dedicated to sending reply messages;
   (iii) measuring a signal to noise plus interference ratio for each transmission beam at each user;
   (iv) sending a reply message from at least one user which receives the polling message, wherein the reply message comprises, at least, a first field which indicates the highest signal to noise plus interference ratio measured by the user among the transmission beams and a second field which indicates an identifier of the transmission beam for which the highest signal to noise plus interference ratio is measured at the user; and wherein the reply message is sent during a time slot randomly selected from a plurality of time slots in which a period of time dedicated to sending reply messages is divided;
   (v) at the transmitter, assigning a user and a transmission bit rate to each transmission beam according to the signal to noise plus interference ratio measured by the assigned user for said transmission beam;
   (vi) simultaneously sending data from a transmission queue to each assigned user at the assigned transmission bit rate over the plurality of transmission beams; and
   (vii) sending an Acknowledgement message to the transmitter from each user which successfully receives data from the transmission queue sent by the transmitter.

2. The method according to claim 1, wherein the transmitter assigns each transmission beam to the user which indicates the highest signal to noise plus interference ratio among all users for that transmission beam in the reply message.

3. The method according claim 1, wherein if the transmitter does not receive any valid reply message, steps (i) through (iv) are repeated until at least one valid reply message is received.

4. The method according to claim 1, wherein the length of each time slot is a fixed time required by a user to send a reply message plus a security margin.

5. The method according to claim 1, wherein each of the users which receives the polling message sends a reply message.

6. The method according to claim 1, wherein a user which receives the polling message sends a reply message if the highest Signal to Noise plus Interference Ratio measured by the user among the transmission beams is above a pre-defined threshold.

7. A System for Medium Access Control in a wireless broadband system with Multiple-Input Multiple-Output or Multiple-Input Single-Output technology with multiuser capabilities comprising:

A transmitter which comprises a plurality of antennas which are capable of creating a plurality of transmission beams to transmit data from a transmission queue to a plurality of users at a frequency, a time and a code;

A plurality of users connected to the transmitter;

control means at the transmitter configured to broadcast to all the users connected to the transmitter a polling message over every transmission beam which requests a state information of, at least, one transmission beam, said polling message includes a length of a period of time dedicated to sending reply messages;

computation means at each user configured to measure a signal to noise plus interference ratio for each transmission beam at each user;

control means at each user configured to:
      send reply messages during a time slot randomly selected from a plurality of time slots in which a period of time dedicated to sending reply messages is divided; wherein the reply messages comprise, at least, a first field which indicates the highest signal to noise plus interference ratio measured by the user among the transmission beams and a second field which indicates an identifier of the transmission beam for which the highest signal to noise plus interference ratio is measured at the user;
      send an Acknowledgement message to the transmitter after successfully receiving data from the transmission queue sent by the transmitter; and a scheduler at the transmitter which assigns a user and a transmission bit rate to each transmission beam according to the signal to noise plus interference ratio measured by the assigned user for said transmission beam.

8. The system according to claim 7, wherein the scheduler at the transmitter is configured to assign each transmission beam to the user which indicates the highest signal to noise plus interference ratio for that transmission beam in the reply message.

9. The system according to claim 7, wherein the control means at each user are configured to send a reply message to the transmitter after every reception of a polling message.

10. The system according to claim 7, wherein the control means at each user are configured to send a reply message to the transmitter after receiving a polling message only if the highest Signal to Noise plus Interference Ratio measured by the user among the transmission beams is above a pre-defined threshold.

* * * * *